Patented June 29, 1948

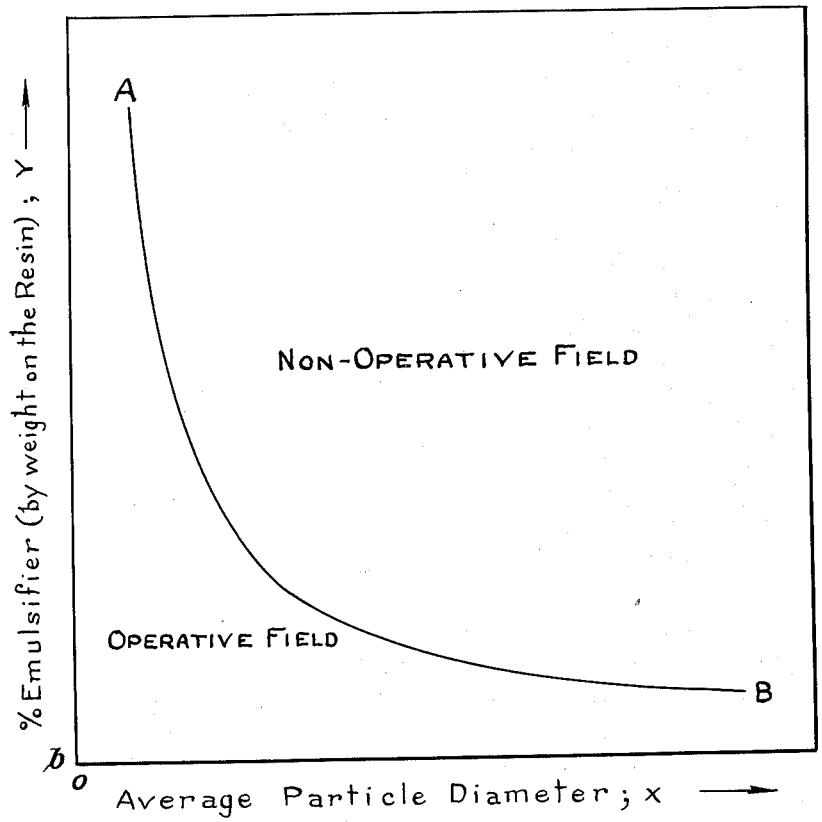

2,444,396

UNITED STATES PATENT OFFICE 2,444,396

STABLE POLYVINYL ACETATE EMULSIONS AND METHOD OF MAKING SAME

Henry Michael Collins, Ottawa, Ontario, and George Osman Morrison, Shawinigan Falls, Quebec, Canada, assignors to Shawinigan Chemicals Limited, Montreal, Quebec, Canada, a corporation of Canada Application June 8, 1945, Serial No. 598,383
In Canada June 8, 1944

4 Claims. (Cl. 260—29.6)

This invention relates to compositions of matter for forming coatings or films and more particularly to compositions containing polyvinyl acetate and made by the polymerization of vinyl acetate in aqueous emulsion.

Polyvinyl acetate is a particularly useful material for coating purposes. However, attempts to use aqueous emulsions of this resin for coating and thus to eliminate the disadvantages of organic solvent solutions have not met with the desired success because of the lack of water-resistance and the sensitivity of the coatings, particularly to re-emulsification and disintegration in water.

Various expedients have been proposed for overcoming these disadvantages. For instance, there have been added to the emulsions, chromates, chromium salts, resins, and peroxides. However, the water-resistance of films from such treated emulsions is not of a high order and the added materials have undesirable effects such as imparting colour, decreasing emulsion stability, and causing the emulsions to foam. Another expedient is heating the films or coatings to relatively high temperatures after they have been deposited. While this does improve their water-resistance to a limited extent, the necessity of the heating procedure greatly restricts their range of application.

It is the general object of the present invention to produce polyvinyl acetate emulsion compositions which are stable over considerable periods of time, entirely satisfactory for commercial purposes, and are prepared from present emulsion-polymerized vinyl acetate which contains as an emulsifying agent, a hydrophilic colloid whose concentration in such parent emulsion is so related to the other components of the emulsion composition, and wherein other components of such composition are so selected and their concentrations so adjusted, that films may be obtained with such aqueous compositions which are characterized by extraordinary resistance to re-emulsification and disintegration on contact in water.

It is a further object of the invention to provide compositions containing polyvinyl acetate emulsions which are capable of yielding continuous, flexible and non-porous films and are suitable both for the manufacture of coated articles as well as of free films.

It is a still further object of the invention to provide coating compositions as characterized above which are suitable also for impregnating, laminating and other uses for which resinous coating compositions are generally employed and which are also useful for the production of heat-sealable coatings.

It is also an object of the invention to provide emulsion compositions of the type indicated above which are capable of yielding water-resisting coatings and films over a wide range of temperatures.

Other objects and advantages of the invention will appear from the following more detailed description.

According to the present invention, there are employed as the parent polyvinyl acetate emulsions, those which are made by polymerizing vinyl acetate in an aqueous medium. In preparing these parent emulsions, certain hydrophilic colloids to be referred to in more detail hereinafter, are employed, along with a catalyst, with or without other desirable additions such as are described in the copending application of Henry Michael Collins, Serial No. 457,337, filed September 4, 1942, now Patent No. 2,388,600, or as described hereinbelow, or as suggested by the prior art but subject to the qualifications set out below.

In carrying out the present invention, there is added to selected emulsions of this type, whose suitability for our purposes is determined in the manner hereinafter more fully described, one or more of certain organic liquids which are solvents or swelling agents for polyvinyl acetate resin and which have limited solubility in water. These agents are hereinafter referred to as "conditioning" agents. Where only one of these agents is employed, it should have, as just stated, only a limited solubility in water; however, where a number of these conditioning agents are employed in combination, it is sufficient if the combination as a whole has a limited solubility in water; certain components of such mixture may, however, have considerable solubility or even be completely water-miscible. The conditioning agent or agents are added in limited amounts, that is, in amounts considerably less than those ordinarily employed in preparing coating solutions of the resin. While we do not wish to be understood as being committed to this theory, it appears that the limited amount of conditioning agent employed in our invention brings about, from a certain point in the drying of the film onwards, the masking of the hydrophilic colloid originally employed in making the parent emulsion; so that, whereas originally the polyvinyl acetate particles were enveloped by the hydrophilic colloid and by a suspension of the colloid in the aqueous dispersion medium, towards the latter part of the drying of a deposited film of the emulsion composition, the hydrophilic colloid is in turn surrounded and thus masked by the conditioning agent in conjunction with the resin. The condition agent, upon continued drying, is of course more or less completely expelled from the film. It will thus be seen that the conditioning agent in effect acts to bring about a reversal of conditions in the emulsion composition as the drying proceeds, so that the action or effect of the hydrophilic colloid which originally permeated the whole composition, is destroyed. This action, we believe, accounts for the fact that films prepared with our emulsion compositions show no tendency to re-emulsify despite the fact that the emulsifying agent is still present in the film.

We have found further, in accordance with the present invention, that the above novel effects obtainable with a conditioning agent as referred to above and described more fully hereinbelow can be satisfactorily and reliably secured only with parent polyvinyl acetate emulsions possessing certain features with respect to particle size and quantity of emulsifying agent.

Having regard to the foregoing, we have invented aqueous polyvinyl acetate resin emulsion compositions capable of forming water-resistant films or coatings which do not re-emulsify or disintegrate in water when laid down by ordinary methods at temperatures ranging from about 0° C. to above normal drier temperatures (approximately 60° C. to 110° C.). These compositions embody parent aqueous emulsions having special characteristics to be elaborated end employing a hydrophilic colloidal material stable in aqueous medium to mild acid and base as emulsifying agent, and small amounts of conditioning agents effective to cause the formation of water-resistant films, such agents usually being solvents and/or swelling agents for the resin of limited water-solubility.

The selection of the parent emulsions is based on our observation of the nature of the special characteristics referred to. We have found that a particular relationship must exist between emulsifier concentration and the average particle size of the solid phase, for emulsions to be useful in the present application. We have discovered that the relationship is an inverse one and that for satisfactory results the emulsifier concentration must not exceed certain limits for a given average resin particle size, and vice versa.

For a clearer explanation of this relationship reference is had to the graph in the accompanying drawing. In this graph, rising particle size is represented by the abscissa, and rising emulsifier concentration by the ordinate. A—B is a typical curve representing the emulsifier concentration-particle size relationship of a characteristic group of stable emulsions employed according to the present invention, and indicates the threshold, or boundary, between the suitable and non-suitable emulsions, the former being in the area to the left and the latter in the area to the right of the curve. In this threshold group, the emulsifier concentration is, of necessity, at or above the minimum amount at which stability is imparted to the emulsion. The average particle size is within the stable emulsion range. The relationship between emulsifier concentration and particle size is within the range effective to permit the conditioning agents to perform their water-resistant filming function. It is evident from the graph that a particle size decrease is advantageous at any emulsifier concentration, since it tends to bring the emulsion further within the water-resistant filming area to the left of the curve and likewise that an emulsifier concentration decrease is also advantageous.

The threshold curve A—B may be represented by the formula:

$$x(y-b)=k$$

where $x$ is the average particle size in microns and $y$ is the percent emulsifying agent based by weight on the resin, $b$ and $k$ are constants having the values about 0.5 and about 9, respectively. According to the principles underlying the present invention, the emulsions employed are those whose respective co-ordinates have a value at least as small as that which satisfies the equation.

In these considerations, it is assumed that the particles are spherical and that nearly all the emulsifier is present as an envelope circumjacent to the surface of the particles. Since the surface area of the particles per unit weight of resin varies inversely as the average diameter of the particles, it would appear that this formula corresponds to the maintenance of a constant thickness of effective emulsifier envelope on the particles whatever their average size.

The above curve extends at its limits into fields which are not considered practical in both the direction of high emulsifier concentration and of large particle size. With respect to the former, viscosity difficulties encountered in making the emulsion tends to make it impractical to use more than about 10% emulsifier by weight on the resin. With respect to the latter, emulsions with an average particle size considerably in excess of 5 microns are not generally used.

Emulsion types

By way of further illustration, we shall now refer to certain specific types of emulsion according to the invention. In one such type, there are used as emulsifiers, two organic hydrophilic colloids which have the ability to act together to form a stable emulsion at a much lower concentration than that at which one would act alone, the emulsifier concentration may be relatively low, preferably less than about 1.2% by weight of the emulsion and disclosed in copending application Serial No. 457,337. Under normal conditions of preparation the particle diameter size of this type averages from about 3.5 microns downward. Other classes of emulsion are those employing as emulsifiers respectively a synthetic hydrophilic colloid, particularly partially hydrolyzed polyvinyl acetates, and a highly water-soluble natural gum, for instance of the arabin type. With these latter classes relatively greater amounts of emulsifier are generally employed to achieve stability so that special steps are taken during its manufacture to reduce the average particle size to within the operative range (for the particular emulsifier concentration required for stability). Compounded with conditioning agents as herein described, all these emulsions are excellent for the present purposes.

These particular emulsion types are merely illustrative of those which may be used according to the invention and it will be understood that the invention is not necessarily limited to their use.

Conditioning agents

The conditioning agents used according to the invention comprise, in general, organic liquids capable of exerting a solvent or swelling action on the resin. These agents classify into the following groups, namely, (1) water-immiscible solvents, (2) solvents having definite but limited solubility in water, usually not greater than about 10%, and (3) mixtures of solvents from either of these groups with substances generally employed as plasticizers for the resin.

These conditioning agents are employed at less than about 25%, generally at an amount within the range from about 3% to about 25% by weight of the parent emulsion. The specific concentration employed is correlated to the emulsifier concentration, particle size and polymer viscosity, so that the amount employed is sufficient, preferably just sufficient, to perform the water-proof filming function. As particle size or emulsifier concentration are lowered, the amount of conditioning agent necessary for water-resistant filming becomes less.

Compositions

Among the compositions which can be made according to the invention are those capable of giving films or coatings which become water-resistant when subjected to ordinary drier temperatures, those capable of giving films or coatings with the same desirable water-resistant properties when applied and allowed to dry at ordinary room temperatures, and those capable of forming water-resistant films at temperatures down to approximately 0° C. The ability to produce compositions capable of giving films or coatings which become water-resistant in the lower temperature range, especially, has opened up vast new fields hitherto closed to polyvinyl acetate emulsion coating compositions.

Films and coatings

The coatings are tough, abrasion-resistant, non-ageing, possess a semi-gloss, have good adhesion, are flexible, grease and oil-resistant, tend to be less sensitive to heat softening than solvent-made films and can be applied to paper, wood, metals, textiles or can be formed as free films.

Preferred films, according to the invention, are resistant to water, to the extent that they will not re-emulsify or disintegrate when immersed for a period of 24 hours in water at a temperature of about 20° C. To all intents and purposes, therefore, they have the characteristics of solvent type polyvinyl acetate lacquers, films or coatings.

Emulsion preparation

To illustrate the invention in more detail, several procedures will be given for the preparation of parent emulsions suitable for the formation of the coating compositions referred to.

Emulsion "A"

In the preparation of one parent emulsion there were employed the following materials.

*Dispersion Medium:* Water_____parts__ 800
*Monomer:* Vinyl acetate_____do____ 900
*Emulsifiers* (percent by weight on the total charge):
   (1) Gum tragacanth_____percent__ 0.25
   (2) Partially hydrolyzed polyvinyl acetate containing 37% polyvinyl acetate by weight, made from polyvinyl acetate of viscosity 7 cps. (at 20° C.; 86 g. p. l. in benzene)_____percent__ 0.5
*Surface Active Agent* (percent by weight on the total charge): "Aerosol O. T." (sodium salt of the sulphonic acid of dioctyl succinic ester)_____percent__ 0.1
*Catalyst* (percent by weight on the vinyl-acetate): Benzoyl peroxide____percent__ 0.166

These materials were charged into a suitable jacketed kettle equipped with a reflux condenser and effective stirring mechanism. The temperature was brought to about 66° C. (reflux temperature) and the charge was held at reflux until the temperature rose to 83° C. The charge was then cooled to about 30° C. and then dumped. The emulsion formed was stable and had about the following characteristics:

Viscosity of emulsion (20° C.)__centipoises__ 700
Total solids_____percent__ 55
Residual vinyl acetate_____do____ .9
Polyvinyl acetate viscosity (86 g. p. l. in benzene at 20° C.)_____centipoises__ 145
Average particle size_____microns__ 3.5

The various emulsifiers which can be used in combination with one another are described in detail in copending application Serial No. 457,337. According to this application, the colloids are classified into "negative" and "positive" types. Among suitable colloids of the negative type are hydrophilic colloidal starches, partially hydrolyzed polyvinyl acetates containing from about zero to about 35% (±2%) polyvinyl acetate, natural gums such as for example gum tragacanth and gum arabic, algae, such as for instance, agar-agar, and the commercial algae known as "Gomagel," and gelatin. Among colloids of the positive type are hydrophilic colloidal partially substituted celluloses such as methyl cellulose and benzyl cellulose, and partially hydrolyzed polyvinyl acetate containing between about 37% (±2%) and about 43% polyvinyl acetate.

Generally speaking, one of the positive type is used with one of the negative type and in certain cases, two of the negative type may be used. In any event, the two agents are employed so that they can be used at a concentration less than that at which either agent alone would stabilize the emulsion. The preferred total concentration is between about .5% and about 1.2% by weight of the emulsion, but for the present purposes, more emulsifier may be used if desired, that is, up to about 1.7%.

An anionic surface-active agent is also employed in conjunction with the colloids at a concentration between about .05% and about .3% by weight of the emulsion.

Emulsion "B"

The following constituents were employed in substantially the following proportions:

*Dispersion medium:* Water_____parts__ 880
*Monomer:* Vinyl acetate_____do____ 900
*Emulsifier* (% by weight on the total charge): Gum arabic_____per cent__ 2.5
*Surface-active agent* (% by weight on the total charge): "Aerosol O. T." (sodium salt of the sulphonic acid of dioctyl succinic ester)_____per cent__ 0.15
*Catalyst* (% by weight on the vinyl acetate): Hydrogen peroxide (in the form of a 28% solution)_____per cent__ 0.024
*Acid modifying agent* (% by weight on the total charge): Glacial acetic acid, per cent__ 0.5
*Accelerator:* Iron chloride (FeCl₃.6H₂O) per cent__ 0.002

The aqueous charge consisting of the emulsifiers, the surface-active agent, the modifying acid, the accelerator and one-quarter of the catalyst was charged into a kettle equipped with a reflux condenser and effective stirring mechanism. Stirring was begun and one-tenth of the vinyl acetate was added. The charge was heated to reflux (about 66° C.) and the temperature was raised slowly to about 75° C. while maintaining reflux. Then, the remainder of the vinyl acetate containing the rest of the catalyst was added at a uniform rate such that the reaction temperature was easily maintained at about 78° C. and the polymerization was complete in three hours or less. The charge was cooled to about 30° C. while stirring and then dumped.

The final emulsion had substantially the following physical properties.

| | |
|---|---|
| Average particle size _____ micron __ | 0.8 |
| Polyvinyl acetate about 75% insoluble viscosity of remainder _____ centipoises __ | 35 |
| Stability _____ | more than 6 months |
| Emulsion viscosity __ centipoises (Hoeppler) _____ | 600 |
| Solids _____ percent __ | 53 |
| pH _____ do ____ | 3.6 |
| Residual vinyl acetate _____ do ____ | 1.9 |
| Percent acid (as acetic acid) __ do ____ | .6 to .7 |

It is important to note that the vinyl acetate is added portion-wise, for instance, a reasonable procedure is to add about 10% of the monomer initially and then to add the remainder slowly in a continuous flow. This has the effect of reducing particle size, of maintaining a narrow particle size distribution curve and of decreasing polymerization time. The $Fe^{+++}$ ion apparently acts as an accelerator in that it causes a change in the kinetics of polymerization from that of "mass" type to that associated with the "active centre propagation" type. Hence, even mild agitation results in emulsions of an exceptionally fine average particle size. The added acid acts as a controlling agent in preventing too rapid loss of catalyst. Sufficient acetic acid is preferably employed to obtain in the final emulsion a pH from about 3.2 to about 3.8 although under some conditions more acid may be used.

The emulsifiers employable are natural highly water-dispersible gums, for instance, those of the arabin type and other natural gums which tend to give relatively clear and homogeneous water dispersions. The amounts employed are preferably less than about 4% by weight of the emulsion, good results being obtained with from about 1% to about 3%, with the limitation that the emulsifier concentration-particle size relationship discussed above is maintained. If there are traces of iron in any of the constituents of the charge, for instance in the emulsifier, the amount added may be decreased and in certain cases, eliminated.

Emulsion "C"

An emulsion was prepared in accordance with the procedure outlined for emulsion "B" with the exception that there was employed as the emulsifier 3% by weight on the emulsion of partially hydrolyzed polyvinyl acetate made from polyvinyl acetate of viscosity of 600 centipoises (86 g. p. l. in benzene at 20° C.) and containing about 16% polyvinyl acetate.

The final emulsion had substantially the following physical properties:

| | |
|---|---|
| Viscosity of emulsion 20° C. ____ centipoises __ | 800 |
| Total solids _____ percent __ | 54 |
| Residual vinyl acetate _____ do ____ | 1.2 |
| Polyvinyl acetate viscosity _____ centipoises __ | 43 |
| Average particle size _____ micron __ | 1.0 |

Other derivatives of polyvinyl acetate such as hydrophilic partial acetals or ethers may be used as the synthetic hydrophilic colloid in place of the partialy hydrolyzed polyvinyl acetate employed in this emulsion. The partially hydrolyzed polyvinyl acetates preferably employable are those containing between about 10% and about 43% polyvinyl acetate. These bodies may be made from polyvinyl acetates having a viscosity within the range from about 7 to about 1000 centipoises. The amount employed is preferably less than about 4% by weight of the emulsion, good results being obtained with from about 1% to about 3%, within the limits of the particle size-emulsifier concentration relationship defined herein.

Generically speaking, it is seen that these preferred emulsions "A," "B" and "C" are stabilized by viscous organic hydrophilic colloids stable to mild acid and base in aqueous medium and substantially neutral as to pH at a total concentration ranging from about .5% to about 4% by weight of the emulsion. It is also preferable to employ an anionic surface-active agent at a concentration ranging from about .05% to about .3% by weight of the emulsion.

The emulsion viscosity may range from about 80 centipoises to about 50 poises, the preferred range being from about 200 to about 2000 centipoises.

The polyvinyl acetate viscosity may vary from about 7 centipoises to about 1000 centipoises with viscosity from about 45 to about 200 centipoises preferred. Insoluble polyvinyl acetate may be present in relatively large amounts and the emulsion will still fall within the demands of the invention. The concentration of the polyvinyl acetate in the emulsion may range from about 30% to about 65% by weight with from about 50% to about 60% preferred.

The term "average particle size" indicates a mean particle size (diameter) as observed under a microscope of sufficiently high magnification, equipped with a scale in the eye piece which has been calibrated by observation of a scale in the field graduated to one-hundredth of a millimetre.

In emulsions of the type of Emulsion "A," the average particle size is generally about three and one-half microns representing a range from about two to about five microns with approximately ten percent of fine particles, less than about two microns, ten percent of course particles, more than about five microns and eighty percent close to the three and one-half micron average.

In the case of the "B" and "C" type emulsions, the average particle size is generally about eight-tenths of a micron representing a range from about one-half micron to about one micron with over eighty percent of the particles close to the average of about eight-tenths of a micron.

Where the emulsion compositions of the present invention are to be employed in humid atmospheres, and especially when coatings are to be applied at relatively low temperatures, which are usually accompanied by high relative humidities, the conditioning agent, or at least one of them where two or more are employed, should be of a relatively low vapor pressure, that is, of generally high boiling point. The use of such a higher boiling point conditioning agent insures that, with the retarded evaporation of the water by reason of the high relative humidity, the organic solvent will not evaporate at a relatively higher rate. In this way, the coating is prevented from losing the conditioning agent while the resin particles, or a large number of them, are still in discrete form. By the use of the higher boiling point conditioning agent, therefore, the rates of evaporation of the water and organic solvent material are made, as nearly as practicable, the same at high relative humidities. Where the coating is to be applied at low temperatures and low relative humidities, the same desideratum can be achieved by increasing somewhat the total amount of the normal conditioning agent; however, improved film formation can then be obtained also by the use of a higher boiling conditioning agent.

The preparation of coating compositions from these typical parent emulsions is illustrated by the following examples which are, of course, furnished merely by way of illustration and not as indicating the limits of the invention.

Example 1

To 100 parts of Emulsion "A" were added 12 parts of ethyl acetate and 3 parts of dibutyl phthalate. In order to form a mobile and smooth composition and to overcome the tendency for a viscosity increase, about 4½ parts of water were dispersed in the solvent charge before addition, and the mixture then dispersed, by efficient stirring throughout the emulsion. A portion of the added materials appeared in the resulting composition as a separate finely divided dispersed phase. The final composition was creamy and stable and had a viscosity of about 2000 centipoises at 20° C. The composition was suitable for various coating purposes.

Two coats of this composition, each of about 0.1 mm. in thickness were brushed onto an unpainted wooden surface. The coating was dry to the touch after about 20 minutes and water-resistant after two hours as shown by no evidence of re-emulsification and disintegration, or loss of continuity after immersion in water at about 20° C. for a period of three days. The coating was also hard, had an eggshell gloss, was strongly adherent, had good abrasion resistance, and retained its useful properties at temperatures ranging from about —40° C. to about 100° C.

A modification of the composition of this example prepared by substituting butyl acetate for the ethyl acetate proved particularly useful because of its ability to key to lacquered and other surfaces sensitive to this solvent.

Example 2

To 100 parts of Emulsion "B" were added 12 parts of benzene, using substantially the same compounding technique as in Example 1. Due to the lesser solubility of benzene in water, the use of approximately 1 part or less of water was sufficient to ensure a smooth emulsion and to prevent undue rise in viscosity.

Self-supporting films were cast from this composition and allowed to dry at room temperature. These films were dust dry in about 20 minutes and had the same excellent water-resistance after two hours' drying as the coatings in Example 1. The other properties were also similar to those of the coatings of Example 1 with the exception that they were, due to the absence of plasticizer, not as flexible at low temperatures.

Example 3

To 100 parts of Emulsion "C" were added 8 parts of ethyl acetate and 6 parts of dibutyl phthalate, substantially according to the procedure of Example 1. A coating composition was thus provided capable of forming coatings and films having the same excellent characteristics as those of Example 1.

Example 4

The following is an example of a typical composition according to the invention especially applicable to the coating of paper. To 100 parts of Emulsion "A" were added, with effective stirring and in the manner prescribed in Example 1, 5.9 parts of ethyl acetate, 3.3 parts of dibutyl phthalate and 2.9 parts of ethanol ethyl ether. The composition formed had a viscosity of about 2500 centipoises at 20° C. Eight parts of composition were diluted with three parts of water. This diluted composition (viscosity about 80 C. P. S. at 20° C.) was used to coat paper. The coating was dried by hot air at about 70° C. The coated paper was pliable, non-blocking and resistant to grease, oil and fats. The coated surfaces of the paper were readily heat-sealable. The coating was water resistant and showed no signs of re-emulsification.

Small amounts of materials, such as from about 0.5% to about 1% of castor oil, which aid in rendering the coating non-blocking, can be added to such compositions for example, with the conditioning agent. The proportions of solvent can also be varied in order to improve the coating characteristics, provided suitable drying conditions are available.

Example 5

This example refers to a coating composition designed for application to paper containers where the film must be resistant to water, possess oil and grease resistance and in addition must be free from all "pinholes" or other discontinuities. The composition described is such that its films require baking at elevated temperatures to give satisfactory water-resistant properties.

To 900 parts of Emulsion "B" were added, with slow and careful stirring, a mixture of 375 parts of water and 100 parts of Emulsion "B", in which had been dispersed with violent stirring 3.3 parts of "Cellite" (diatomaceous earth) powder, 3.3 parts of bentonite powder, followed by 40 parts of xylene and 30 parts of dibutyl phthalate. The completed charge was allowed to de-aerate for twelve hours and the composition separated from any foam head. The above method of compounding was effective to prevent the formation of the minute air bubbles that tend to persist in the composition and which would cause "pinholes" in films and coatings laid down from it. This composition had a final viscosity of 80 C. P. S. at 20° C. in the agitated state and 300 C. P. S. at 20° C. at rest. This thixotropic effect was caused by the bentonite. The composition contained about 40% solids, was substantially non-foaming and did not tend to occlude air even under adverse operating conditions.

The composition was placed in a long applicator trough. Containers were rolled by a conveyor belt through this trough, and drained, for a short time. The "drip" was caught and pumped back to the applicator trough. The coated containers were then subjected to a hot air dryer, at temperatures from about 160° F. to about 220° F., for about four minutes. The container coatings after cooling were non-blocking, grease, fat and oil resistant, continuous, glossy, abrasive-resistant and pliable at normal temperatures. The coatings were also free from discontinuities normally caused by entrapped air, and were free from re-emulsification or disintegration on contact with water. This composition is thus of particular utility for the production of uniform, continuous coatings owing to its ability to resist the permanent introduction of air even under adverse conditions.

Example 6

To 100 parts of Emulsion "A" at 70° C. in a closed kettle were added with efficient and active stirring 18 parts of "Titanox RA" (titanium dioxide) in the form of a thick, finely dispersed water paste. To this pigmented base emulsion, after cooling, there was added as described in Example 1, 12 parts of ethyl acetate, 5 parts of dibutyl phthalate and 4 parts of water. The final composition was creamy and stable and had an emulsion viscosity of 220 centipoises.

Two coats of this composition, each of about 1 mil in thickness were brushed onto an unpainted wooden surface. The coating was dry to the touch in about 20 minutes and water-resistant after two hours as shown by no evidence of re-emulsification, disintegration or loss of continuity after immersion in water at about 20° C. for a period of three days.

The procedure described results in a typical pigmented coating composition. Coatings formed from such compositions are exceptionally hard, smooth and opaque and possess a semi-gloss. They have all the good properties of the films formed from the non-pigmented compositions described above and, in addition, a higher resistance to thermal softening. The pigment is distributed throughout the composition as unit particles of from about 0.6 micron to about 2.0 microns in diameter.

Example 7

To 100 parts of Emulsion "A" were added in the manner described in Example 1, 6 parts of ethyl acetate, 5 parts of dibutyl phthalate and about 8 parts of butyl-beta-hydroxy-butyrate.

This new composition was brushed at 3° C. and at a relative humidity of about 80%, over unpainted wood, which had been previously chilled. After about 2 hours drying the 1 mil film so formed was capable of undergoing immersion in water for three days without showing loss of continuity, re-emulsification or disintegration. The film retained a slight amount of tack for an additional 24 hour period, but after such ageing exhibited a semi-gloss and had the properties already described for this type of film. It is understood that this further modification may be applied to any of the coating compositions described herein. Similarly these new compositions can be applied by any conventional method to any of the surfaces mentioned in the preceding examples.

This composition is characteristic of those suitable for use at low temperatures accompanied by high relative humidities. A typical high-boiling organic solvent with a definite but low solubility in water is employed as the filming agent for reasons explained hereinabove.

Example 8

To 100 parts of parent Emulsion "B" were added according to the procedure of Example 1, about 7 parts of ethyl acetate, about 5 parts of toluene and about 4 parts of dibutyl phthalate, the viscosity being controlled by the addition of about 4 parts of water dispersed in the filming agents.

This composition was applied to moisture-proof Cellophane (coating with cellulose nitrate lacquer) and gave coatings which were adherent, which had excellent physical properties, were heat-sealable and showed no tendency to re-emulsify or disintegrate.

The toluene acts both as a filming agent and as an aid to adhesion to the moisture-proof coating on the Cellophane which contains a certain amount of wax.

GENERAL DISCUSSION

Conditioning agents

The conditioning agents which we have found preferable for use at normal temperatures or higher are water-immiscible volatile neutral solvents for the resin. They include acetic acid esters, for example, ethyl, butyl and vinyl acetate; aromatic compounds like benzene and toluene. They also include combinations of such solvents with swelling agents such as diethyl phthalate, dibutyl phthalate, and other materials usually employed as plasticizers for the polyvinyl acetate. The solvents and/or swelling agents may, therefore, be termed in a generic sense "conditioning agents."

For temperatures from about 20° C. down to about 0° C. we have found it preferable to use relatively high boiling liquids which either have a definite but low solubility in water, such as for instance, cyclohexanone or butyl-beta-hydroxy butyrate, or limited amounts of water-soluble liquid such as the Cellosolves (glycol esters and ethers) in conjunction with other conditioning agents so as to regulate the solubility in water of the mixture. These solvents and mixtures should preferably have a solubility in water at room temperature not greater than that of butyl-beta-hydroxy butyrate.

It will be understood that mixed solvents or swelling agents may be employed instead of a single solvent and/or swelling agent.

The conditioning agents are used at a concentration effective to perform a water-proof filming function at the particular emulsifier concentration and particle size of the emulsion to which they are applied, but the amounts should not be sufficiently high to reduce the stability or otherwise adversely affect the composition. Generally, the amounts range from about 3% to about 25% by weight of the emulsion but vary specifically for particular agents. The minimum amounts also vary with the temperature at which the composition is to be employed. The following are illustrative of the concentrations which can be used in compositions to be employed at about 20° C. and upwards where the "A" type emulsions are concerned. Benzene or toluene is effective at a concentration ranging from about 9% to about 17% by weight on the emulsion when employed without a plasticizer. When used with a plasticizer for the polyvinyl acetate, these concentrations may be reduced somewhat, for instance, to that amount which is just sufficient to produce the desired film when the composition is deposited. For instance, 6% benzene with 5% dibutyl phthalate is substantially as effective as about 9% benzene without plasticizer. In conjunction with a plasticizer at concentrations ranging from about 1% to about 4%, benzene is effective at a concentration ranging from about 9% to about 7%.

Certain agents which are practically ineffective when used alone are rendered effective by the use in conjunction therewith of a plasticizer. For instance, ethyl acetate when used alone requires concentrations of about 15% by weight of the emulsion whereas with about 3% plasticizer, this agent may be used at concentrations of about 10% and with about 5% plasticizer at concentrations of about 8%. Generally speaking, therefore, ethyl acetate is effective at concentrations ranging from about 8% to about 11% when used with a plasticizer such as dibutyl phthalate at a concentration ranging from about 5% down to about 1%. Where the drying temperatures are higher than 20° C. the amount of filming agents may be reduced. For instance, at drier temperatures of about 70° C. about three-quarters of the amounts specified above will be sufficient to accomplish the desired effect.

The concentration of conditioning agent required will progressively decrease the further the parent emulsion employed is located from the threshold line defined above.

Plasticizer

The usual plasticizers for the polymer may be employed. Those preferred are compounds such as dibutyl phthalate or alkyl esters of the dicarboxylic aromatic acids, "3 G. H." (triethylene glycol 2 ethyl butyrate) and "3 G. O." (triethylene glycol 2 ethyl hexoate). There may also be used some permanent resinous materials among which are certain copolymers of vinyl acetate with butyl and octyl crotonates, for example, the copolymer containing about 35% polybutyl crotonate and polyvinyl acetate, which is a semi-liquid at room temperature.

The amount of plasticizer effective will vary with the specific polyvinyl acetate used, that is, the higher the polymer the more plasticizer required, but it should be sufficient to make the film resistant to temperature changes. This is generally between about 1% and about 9% by weight of the emulsion. The plasticizer and the filming agent are supplementary when used as conditioning agents, so that an increase in concentration of one allows a decrease in concentration of the other, substantially proportionally.

Pigments

There can be used as pigments and fillers, that group of organic or inorganic solids of the necessary fineness, that are relatively water-insoluble, non-reactive with the other components of the composition and are not sensibly soluble in or sensitive to any of the filming agents or other dispersed organic liquids contained in the composition. Among such pigments are Bone Black, Venetian Red, Tuscan Red, Ultramarine Blue, Mineral Black, iron oxides and titanium dioxide (Titanox). Any concentration up to just below the amount which would destroy the physical properties and/or continuity of the resin film may be used where hiding power is the main consideration. This is generally within the range from about 10% to about 80% by weight of the emulsion, but will vary somewhat for the specific pigment, with the state of division of the pigment, and with the average particle size of the emulsion. The finer the average particle size, generally speaking, the more pigment the emulsion will tolerate.

Other components

Other components may also be added to the emulsion. Among these are fillers, dyes, resins, oils and relatively neutral organic liquids. These can all be used at amounts within reason for certain specific or enhanced effects without changing the novel properties inherent in the dried film of the coating compositions according to the invention.

Compounding

The process of dispersing the various liquid filming agents and/or plasticizers in the emulsion includes the preparation of these filming agents before dispersion in the emulsion so that the emulsion viscosity will not be increased to any large extent when these agents are dispersed therein. To this end, water is admixed with the conditioning agent in an amount just in excess of the saturation point. This admixture is then introduced rapidly with efficient stirring for instance, of the same type as used to form the emulsion, but at slower speeds usually not exceeding 100 R. P. M. (in the type of apparatus described in the above-named application), to the parent emulsion. A criterion of adequate dispersion is the presence of the solvent and plasticizer particles at a diameter not greatly in excess of those of the solid phase. This desideratum can be obtained by any system of agitation that tends to give liquid shear with the introduction of a minimum amount of air.

An alternative method of preparation is to disperse the filming agents, prepared as described above, into a portion of the parent emulsion which has been highly diluted with water and then to add this dispersion with slow and careful stirring to the main bulk of the emulsion.

The dispersion of pigments in the compositions may be effected by various methods as for example, by introducing the previously dispersed pigment to the composition with adequate stirring or by any other suitable method and generally at elevated temperatures in closed vessels.

Ordinarily, the coating compositions are aged by being allowed to stand for a period before being applied. Where necessary or desirable, this aging may be accomplished by heating to about 60° F. for about 1 hour.

Coating compositions

As will be evident from the above, the finished coating compositions may vary as to the nature and concentration of the constituents. An important characteristic of the compositions which may be varied in different ways, is their viscosity. For instance, preferred parent emulsion viscosities may range between about 50 centipoises and 5000 centipoises (measured by the dropping ball method at 20° C.) by varying the total solids from between about 42% to about 60% by weight. The addition of filming agents and/or plasticizers tends to increase the viscosity, but this tendency can be controlled by dispersing a limited amount of water in the agents being added before they are dispersed in the parent emulsion, or by adding water to the finished composition. The tendency for the viscosity to increase is more marked with high viscosity-high solid emulsions than with those of lower viscosity and lower solids.

Advantages

The numerous advantages inherent in these coating compositions and the films formed therefrom will be clear from the above.

The films deposited are remarkably tough and adherent and possess grease, fat and oil resistance of the highest order. Pliability over a fairly wide temperature range can be achieved while non-blocking characteristics are maintained. The dried films are heat-sealable and in the absence of a pigment, are relatively clear. Furthermore, an important property of these films resides in the fact that they will not re-emulsify or disintegrate even after long immersion in water. The film is somewhat fire-resistant and resists aging under the combined action of wind, sun, frost, gases and water and does not tend to yellow or discolour even when exposed to severe conditions.

Definitions

In the specification the viscosity measurements referred to in connection with the parent emulsions or coating composition emulsions are performed by the dropping ball method at 20° C. Polymer viscosities are the viscosities in centipoises measured at 20° C. of a one molar solution of the polymer in benzene.

It will be understood, that without departing from the spirit of the invention or the scope of the claims, various other modifications may be made in the specific expedients described. The latter are illustrative only and not offered in a restricting sense, it being desired that only such limitations shall be placed thereon as may be required by the state of the prior art.

We claim:

1. A composition of matter for the formation of coatings and films comprising as essential constituents, a stable aqueous emulsion containing from 30% to 65% polyvinyl acetate as the resin phase, hydrophilic colloidal material as the emulsifier in an amount effective to stabilize the emulsion and lying between 0.5% and 4% by weight of the emulsion, and an organic liquid conditioning agent, selected from the group consisting of neutral solvents and swelling agents for the resin having a solubility in water not exceeding 10%, and being within the range from 3% to 25% by weight of the emulsion, the emulsion being such that the coordinates $x$ and $y$ are at least as small as those satisfied by the equation $x(y-0.5)=9$ in which the coordinate $x$ is the average particle size in microns and the coordinate $y$ is the percent emulsifying agent based by weight on the resin, $x$ not exceeding 5 the amount of the conditioning agent, the amount of emulsifier and the average particle size being corelated to render said composition capable of forming when deposited a continuous water-resistant film of the resin, which will not re-emulsify or disintegrate when immersed for a period of 24 hours in water at a temperature of 20° C.

2. A process of making a composition of matter for the formation of water-resistant coatings and films, comprising, selecting a stable aqueous emulsion containing from 30% to 65% polyvinyl acetate as the resin phase, hydrophilic colloidal material as the emulsifier in an amount effective to stabilize the emulsion and lying between 0.5% and 4% by weight of the emulsion, the emulsion being such that the coordinates $x$ and $y$ are at least as small as those satisfied by the equation $x(y-0.5)=9$ in which the coordinate $x$ is the average particle size in microns and the coordinate $y$ is the percent emulsifying agent based by weight on the resin, $x$ not exceeding 5 and dispersing in said emulsion with the aid of agitation a liquid conditioning agent selected from the group consisting of neutral solvents and swelling agents for the resin having a solubility in water not exceeding 10% and in an amount within the range from 3% to 25% by weight of the emulsion, the amount of the conditioning agent, the amount of the emulsifier and the average particle size being correlated to render said composition capable of forming when deposited a continuous water-resistant film of the resin, which will not re-emulsify or disintegrate when immersed for a period of 24 hours in water at a temperature of about 20° C.

3. A process, according to claim 2, wherein an aqueous dispersion containing the conditioning agent is first formed, the water being present in said dispersion in an amount effective at least to saturate the conditioning agent, the dispersion is introduced into a dilute portion of the emulsion with agitation to form a second dispersion, and then the second dispersion is added to the main body of the emulsion with slow agitation, whereby the conditioning agent is thoroughly dispersed therein and the viscosity is maintained within an effective filming range.

4. A process, according to claim 2, comprising, prior to dispersing the conditioning agent in the emulsion, preparing a mixture of water and said conditioning agent in which the water is present in an amount just in excess of that required to saturate the conditioning agent and adding the mixture to the emulsion rapidly with efficient agitation.

HENRY MICHAEL COLLINS.
GEORGE OSMAN MORRISON.

REFERENCES CITED

The following references are of record in the file of this patent:

UNITED STATES PATENTS

| Number | Name | Date |
|---|---|---|
| 2,227,163 | Starck et al. | Dec. 31, 1940 |
| 2,316,629 | Schmitz | Apr. 13, 1943 |